(12) United States Patent
Zhou et al.

(10) Patent No.: US 11,269,540 B2
(45) Date of Patent: Mar. 8, 2022

(54) METHOD, APPARATUS, AND COMPUTER PROGRAM PRODUCT FOR MANAGING APPLICATION SYSTEM

(71) Applicant: EMC IP Holding Company LLC, Hopkinton, MA (US)

(72) Inventors: Yizhou Zhou, Chengdu (CN); Simon Yuting Zhang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/286,591

(22) Filed: Feb. 27, 2019

(65) Prior Publication Data

US 2020/0117367 A1 Apr. 16, 2020

(30) Foreign Application Priority Data

Oct. 12, 2018 (CN) .......................... 201811192181.7

(51) Int. Cl.
*G06F 3/06* (2006.01)
*G06F 16/23* (2019.01)
*G06F 11/14* (2006.01)

(52) U.S. Cl.
CPC ............ *G06F 3/065* (2013.01); *G06F 3/0619* (2013.01); *G06F 3/0673* (2013.01); *G06F 11/1458* (2013.01); *G06F 16/2365* (2019.01)

(58) Field of Classification Search
CPC ....... G06F 11/1446–1474; G06F 3/065; G06F 3/0619; G06F 3/0673; G06F 16/2365; G06F 3/06–0689
See application file for complete search history.

(56) References Cited

U.S. PATENT DOCUMENTS

| 9,740,571 | B1* | 8/2017 | Chopra ................. G06F 11/302 |
| 2014/0289203 | A1* | 9/2014 | Chan ...................... H04L 65/60 |
| | | | 707/652 |
| 2020/0097452 | A1* | 3/2020 | Nomura .............. G06F 16/2255 |
| 2020/0159624 | A1* | 5/2020 | Malkov ............... G06F 11/1448 |

* cited by examiner

*Primary Examiner* — Nicholas J Simonetti
(74) *Attorney, Agent, or Firm* — Womble Bond Dickinson (US) LLP (57) ABSTRACT

The present disclosure relates to a method, apparatus and computer program product for managing an application system. According to example implementations of the present disclosure, there is provided a method for managing an application system. In the method, backup data of the application system are generated in response to receiving a backup request for the application system; abstract information of the backup data is obtained on the basis of a predefined abstract rule; the abstract information is transmitted to a blockchain system associated with the application system so as to store the abstract information to the blockchain system; and the application system is managed on the basis of the blockchain system and the backup data. Further, there is provided an apparatus and computer program product for managing an application system.

21 Claims, 8 Drawing Sheets

METHOD, APPARATUS, AND COMPUTER PROGRAM PRODUCT FOR MANAGING APPLICATION SYSTEM

CROSS-REFERENCE TO RELATED APPLICATION

This patent application claims priority, under 35 U.S.C. § 119, of Chinese Patent Application No. 201811192181.7, filed Oct. 12, 2018, entitled "METHOD, APPARATUS, AND COMPUTER PROGRAM PRODUCT FOR MANAGING APPLICATION SYSTEM."

FIELD

Various implementations of the present disclosure relate to application systems, and more specifically, to a method, apparatus and computer program product for managing backup data of an application system.

BACKGROUND

With the development of computer technologies, security management techniques have been widely applied to various types of application systems. In a variety of application environments, backup operation usually needs to be performed to data in an application system, so as to restore the application system on the basis of backup data when a failure or other situation occurs in the application system. Since the backup data serve as a basis to restore the application system, it becomes a focus of research regarding how to manage the backup data of the application system in a more secure and reliable way.

SUMMARY

Therefore, it is desirable to develop and implement a technical solution for managing an application system more effectively. It is desired that the technical solution can be compatible with existing application environments and manage the application system more effectively by reconstructing various configurations of existing application environments.

According to a first aspect of the present disclosure, there is provided a method for managing a storage system. In the method, backup data of the application system are generated in response to receiving a backup request for the application system; abstract information of the backup data is obtained on the basis of a predefined abstract rule; the abstract information is transmitted to a blockchain system associated with the application system so as to store the abstract information to the blockchain system; and the application system is managed on the basis of the blockchain system and the backup data.

According to a second aspect of the present disclosure, there is provided an apparatus for managing a storage system. The apparatus comprises: at least one processor; a volatile memory; and a memory coupled to the at least one processor, the memory having instructions stored thereon, the instructions, when executed by the at least one processor, causing the apparatus to perform acts. The acts include: generating backup data of the application system in response to receiving a backup request for the application system; obtaining abstract information of the backup data on the basis of a predefined abstract rule; transmitting the abstract information to a blockchain system associated with the application system so as to store the abstract information to the blockchain system; and managing the application system on the basis of the blockchain system and the backup data.

According to a third aspect of the present disclosure, there is provided a computer program product. The computer program product is tangibly stored on a computer readable medium and comprises machine executable instructions which are used to implement a method according to the first aspect.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
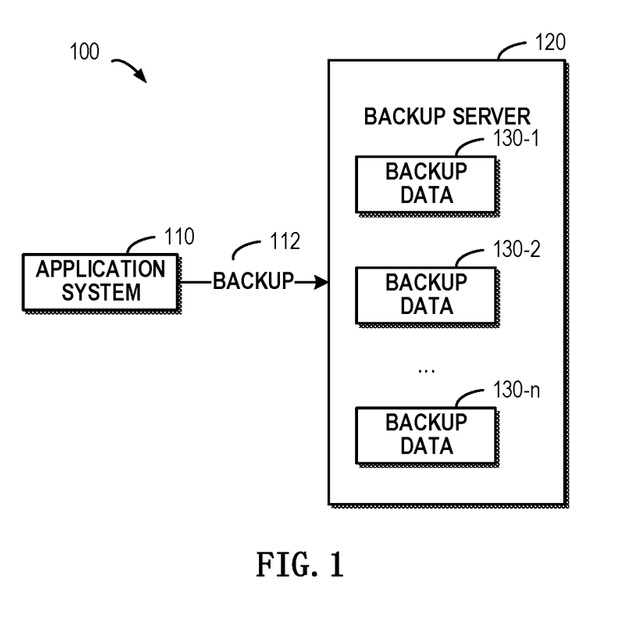
FIG. 1 illustrates a schematic view of an application environment in which implementations of the present disclosure may be applied.

FIG. 1 schematically shows a block diagram of an application environment 100 in which implementations of the present disclosure may be applied. As depicted, an application system 110 may be a system for implementing various functions. For example, the application system 110 may be a data storage system, an operating system, a game system, or a system for implementing other function. Hereinafter, only a data storage system will be taken as one example to describe details about various implementations for managing the application system 110. To improve the reliability of the application system 110, as shown by an arrow 112, backup operation may be performed to the application system 110. For example, where the application system 110 is a storage system, backup operation may be performed to various files, data tables or other objects in the storage system.

A backup server 120 may be used to store multiple backups (such as backup data 130-1, 130-2, . . . , and 130-n) which are obtained by the application system 110 at different time points. Here various backup data may be collectively referred to as backup data 130. The security of backup data in the backup server 120 needs to be guaranteed, so that the application system 110 may be restored to specified backup data where the backup server 120 is attacked by malware or Hackers.

There have been developed technical solutions for improving the security of the backup data 130 in the backup server 120 on the basis of techniques such as access authority verification, encryption/decryption and so on. However, none of existing technical solutions can effectively protect the security of the backup server 120. Malware or Hackers might tamper with the backup data 130, and in consequence, the application system 110 cannot be restored correctly. Therefore, it is a focus of research regarding how to manage the application system 110 and associated backup data 130 in a more secure and effective way.

Figure 2:
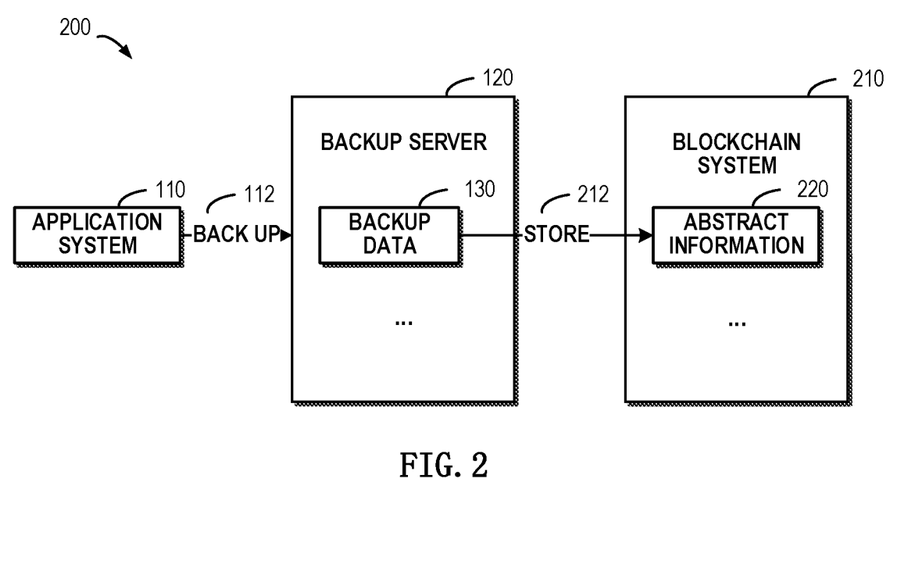
FIG. 2 schematically illustrates a block diagram for managing an application system according to implementations of the present disclosure.

To at least partially solve problems in existing technical solutions, implementations of the present disclosure provide a method, apparatus and computer program product for managing the application system 110. With reference to FIG. 2, a general description is presented below example implementations of the present disclosure. FIG. 2 schematically shows a block diagram 300 for managing the application system 110 according to implementations of the present disclosure. In the implementations, a blockchain system 210 may be arranged for storing abstract information 220 of the backup data 130 of the application system 110. Since the blockchain system 210 is tamper-proofing, it can be guaranteed the abstract information 220 will not be tampered with and is trustworthy. Subsequently, it may be verified on the basis of the trustworthy abstract information 220 whether the backup data 130 are tampered with or not.

As shown in FIG. 2, if a backup request for the application system 110 is received (as shown by an arrow 112), backup data 130 of the application system 110 may be generated. Specifically, backup operations may be performed to the application system 110 at different time points, so as to form multiple backup data. It will be understood although the backup server 120 in FIG. 2 illustrates only one backup data 130, the backup server 120 may further comprise more backup data.

On the basis of a predefined rule, abstract information of the backup data 130 may be obtained. It will be understood how to obtain the abstract information is not limited here, but various ways may be used to obtain the abstract information as a specific application environment demands. For example, the abstract information may be obtained on the basis of algorithms such as MD5, SHA1, or SHA 256. After the abstract information is obtained, the abstract information may be transmitted to the blockchain system 210 associated with the application system 110, so as to store the abstract information 220 to the blockchain system 210. As is well known, blockchain technology is decentralized storage technology, and the data structure of blockchains is provided with traceable and integrity-verifiable nature. Therefore, by storing the abstract information 220 in the blockchain system 210, the trustability of the abstract information 220 can be ensured using the reliability of blockchain technology. Subsequently, the application system 110 may be managed on the basis of the blockchain system 210 and the backup system 130.

With the foregoing example implementations, by virtue of high reliability of the blockchain system 210, the abstract information 220 stored in the blockchain system 210 is put under high protection and will not be tampered with. Even if the backup data 130 in the backup server 120 are tampered with, it may be determined whether the backup data 130 are tampered with, by comparing the abstract information of the backup data 130 in the backup server 120 with the abstract information 220 stored in the blockchain system 210 beforehand. In this way, further security protection is provided on the basis of various security protective measures of the existing backup server 120.

Figure 3:
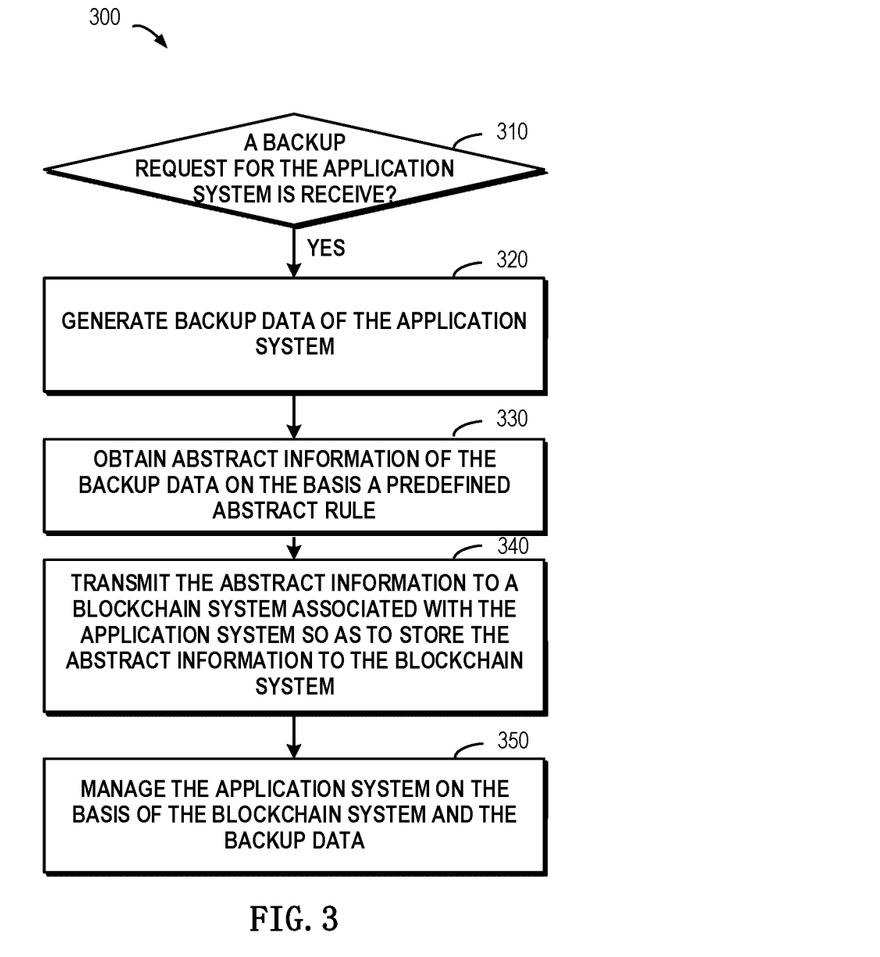
FIG. 3 schematically illustrates a flowchart of a method for managing an application system according to implementations of the present disclosure.

With reference to FIG. 3, description is presented below to more details about example implementations of the present disclosure. FIG. 3 schematically shows a flowchart of a method 300 for managing the application system 110 according to implementations of the present disclosure. At block 310, it may be determined whether a backup request for the application system 110 is received. Here the backup request may be a request which is triggered at predefined time intervals, a request which is trigger in response to determining a potential anomaly occurs in the application system 110, or a request which is triggered by the administrator or a user of the application system 110.

If a backup request is received, then the method 300 proceeds to block 320. At block 320, backup data of the application system 110 are generated. Here, the backup data 130 may be generated on the basis of data copy operation. Alternatively and/or additionally, copied data may further be compressed so as to lower the data volume of the backup data 130. Alternatively and/or additionally, copied data may further be subjected to encryption operation so as to improve the security of data.

Figure 4A:
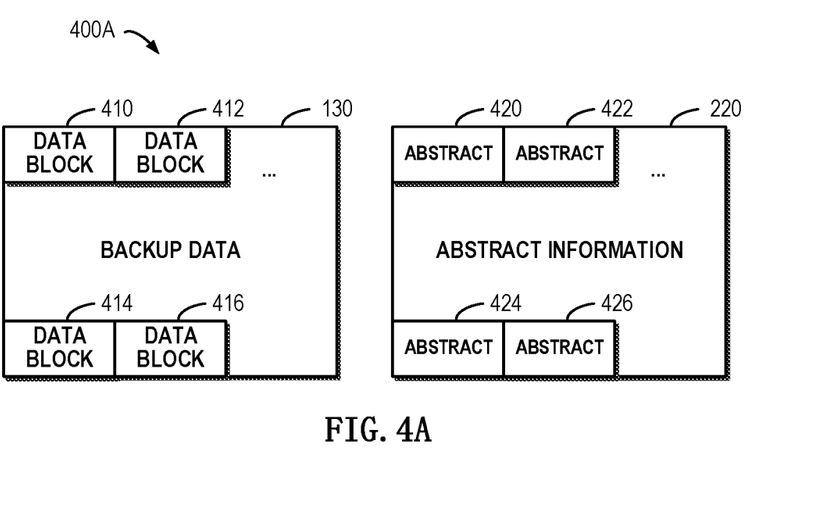
FIG. 4A schematically illustrates a block diagram of data structures of backup data and corresponding abstract information according to implementations of the present disclosure.

According to example implementations of the present disclosure, the backup data may further be divided into a group of data blocks, and each data block in the group of data blocks may be further processed. FIG. 4A schematically shows a block diagram 400 of respective data structures of the backup data 130 and the corresponding abstract information 220 according to implementations of the present disclosure. As depicted, the backup data 130 may be divided into data blocks 410, 412, 414 and 416. Next, corresponding abstracts 420, 422, 424 and 426 may be generated for the data blocks 410, 412, 414 and 416 respectively. At this point, the abstract information 220 may comprise multiple abstracts, and each abstract corresponds to one data block in the backup data 130.

Various approaches may be used to divide the backup data into data blocks. For example, according to example implementations of the present disclosure, the backup data may be divided into data blocks according to a predefined size. Suppose the predefined size is 4 MB, the whole backup data 130 may be divided continuously. At this point, resultant data blocks have the same size, which is 4 MB. According to example implementations of the present disclosure, the backup data may further be divided into data blocks in other way. With the example implementations, by dividing the backup data 130 into smaller data blocks, a corresponding abstract may be generated for each data block, and further the security of each data block can be ensured with finer granularity.

It will be understood the backup data 130 might contain repetition. For example, suppose the backup data 130 comprise multiple copies of the same image file, if the backup data are divided according to a fixed size, then files might be cut improperly. According to example implementations of the present disclosure, the backup data 130 may further be divided according to content of files therein. Specifically, sample fragments containing the same content may be extracted from the backup data 130. Here, the sample fragment may be, for example, an image file appearing at multiple locations in the backup data 130. At this point, multiple locations of the image file may be determined, and the backup data 130 may be divided into a group of data blocks on the basis of the multiple locations.

For example, suppose the backup data 130 include three copies of an image file, and the three copies are within three address ranges [add1, add2], [add3, add4] and [add5, add6] in the backup data 130 respectively. At this point, three corresponding data blocks may be generated on the basis of the three address ranges. Subsequently, it may further be determined whether there exists repetition in other portions of the backup data 130. If yes, then the backup data may be divided into data blocks on the basis of a range to which the repetition belongs. Alternatively and/or additionally, the rest of the backup data may be divided into multiple data blocks according to a predefined size.

With the above example implementations, when storing the backup data 130, since data within [add1, add2], [add3, add4] and [add5, add6] are same, data within only one of the address ranges need to be storage. Further, a special mark may be arranged to indicate data within the address ranges [add3, add4] and [add5, add6] are the same as data within [add1, add2]. In this way, a storage space occupied by the backup data 130 may be reduced.

Returning to FIG. 3, at block 330, abstract information of the backup data 130 may be obtained on the basis of a predefined abstract rule. For example, the abstract information may be determined on the basis of algorithms, such as MD5, SHA1 or SHA256. As described above, when the backup data 130 comprise multiple data blocks, corresponding abstracts 420, 422, 424 and 426 may be generated for data blocks 410, 412, 414 and 416 respectively. With reference to Table 1 to Table 3, detailed description is presented below regarding how to generate abstracts for respective data blocks. Referring to Table 1, this table shows a schematic structure of a data block, wherein the first column represents data in the data block, and the second column represents a location of the data block. Table 1 shows three data blocks. With reference to the first data block in Table 1, content of this data block is "0xfa13bcd48abd," and this data block appears at locations loc1, loc2, loc3 and loc4 in the backup data 130. It will be understood here the data block may further be subjected to compression, encryption or other processing, so as to reduce the storage space of the data block and/or improve the security of data.

TABLE 1

Schematic Structure of Data Block

| Data Block | Location of Data Block |
|---|---|
| 0xfa13bcd48abd | loc1, loc2, loc3, loc4 |
| 0x449bdcafe39ecaff2947 | loc5, loc6 |
| 0xabc2367fd2 | loc7, loc8, loc9 |
| ... | ... |

According to example implementations of the present disclosure, a corresponding abstract may be generated for each data block shown in Table 1. The second column and the third column in Table 2 have the same content as the first column and the second column in Table 1, and thus are not detailed. In Table 2 below, the first column represents an abstract of a data block, wherein the abstract may be generated on the basis of data in the second column, e.g. generated by performing SHA256 operation to data in the second column.

TABLE 2

Schematic Structure of Abstract and Data Block

| Abstract | Data Block | Location of Data Block |
|---|---|---|
| 7256a551 ... | 0xfa13bcd48abd | loc1, loc2, loc3, loc4 |
| Bc8d5832 ... | 0x449bdcafe39ecaff2947 | loc5, loc6 |
| 3d1e5e06 ... | 0xabc2367fd2 | loc7, loc8, loc9 |
| ... | ... | ... |

According to example implementations of the present disclosure, an abstract represented by the first column in Table 2 may further be generated on the basis of the second column and the third column. For example, the abstract may be generated using SHA256 algorithm by concatenating data in the second and third columns. At this point, the abstract not only comprises information of the data block itself, but also comprises information of a location of the data block. In this way, the backup data 130 can be protected in a more secure and reliable manner.

According to example implementations of the present disclosure, an overall abstract may further be generated on the basis of content in three columns of Table 2. The second column, the third column and the fourth column in Table 3 have the same content as the first column, the second column and the third column in Table 2, and an overall abstract in the first column of Table 3 may be generated using SHA256 algorithm by concatenating data in the second, third and fourth columns.

TABLE 3

Schematic Structure of Abstract and Data Block

| Overall Abstract | Abstract | Data Block | Location of Data Block |
|---|---|---|---|
| 594bf829 ... | 7256a551 ... | 0xfa13bcd48abd | loc1, loc2, loc3, loc4 |
| ef7af05d ... | Bc8d5832 ... | 0x449bdcafe39ecaff2947 | loc5, loc6 |

TABLE 3-continued

Schematic Structure of Abstract and Data Block

| Overall Abstract | Abstract | Data Block | Location of Data Block |
|---|---|---|---|
| 2b470998 . . . | 3d1e5e06 . . . | 0xabc2367fd2 | loc7, loc8, loc9 |
| . . . | . . . | . . . | . . . |

Figure 4B:
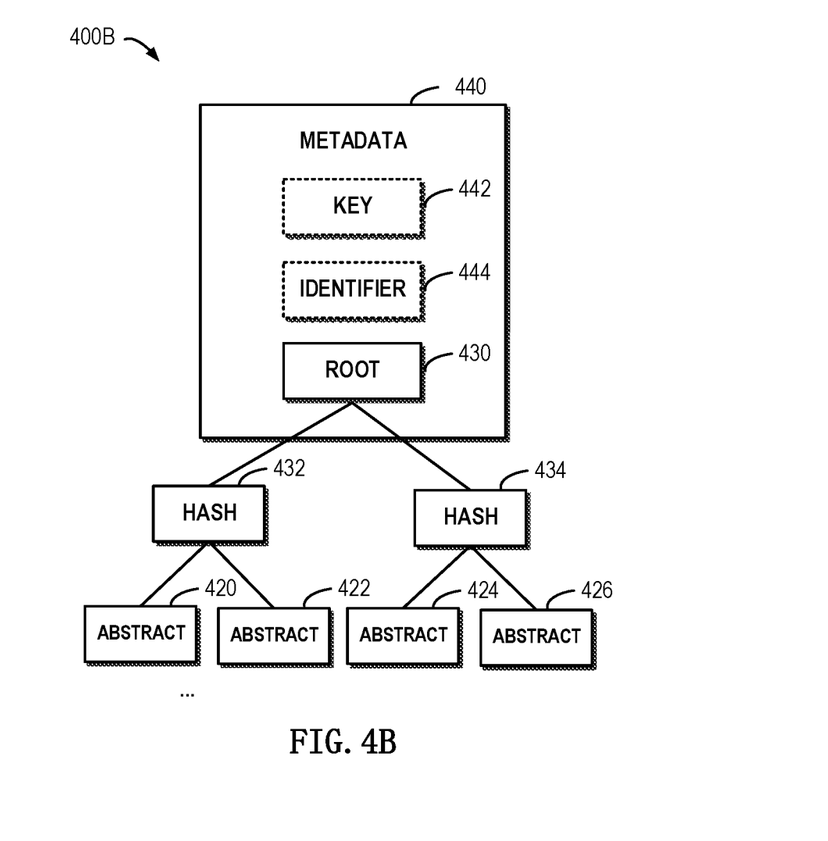
FIG. 4B schematically illustrates a block diagram for generating metadata on the basis of abstract information according to implementations of the present disclosure.

Description has been presented above regarding how to generate respective abstracts on the basis of respective data blocks in the backup data 130, at which point the abstract information 220 will comprise abstracts of respective data blocks. Subsequently, the abstract information may be transmitted from the backup server 120 to the blockchain system. Returning to FIG. 3, at block 340, the abstract information is transmitted to a blockchain system 210 associated with the application system 110, so as to store the abstract information to the blockchain system 210. As shown in FIG. 4A, the abstract information 220 may comprise abstracts 420, 422, 424 and 426 for data blocks 410, 412, 414 and 416 respectively. At this point, the abstract for each data block may be transmitted from the backup server 120 to the blockchain system 210, and each abstract may be stored in the blockchain system 210. With reference to FIG. 4B, detailed description is presented below to more details about generating metadata on the basis of abstract information.

According to example implementations of the present disclosure, the backup server 120 may notify the blockchain system 210 to create metadata on the basis of the received abstract information 220 and further generate a block node in the blockchain system. FIG. 4B schematically shows a block diagram 400B of generating metadata on the basis of abstract information according to implementations of the present disclosure. In the example implementation, metadata 440 may be generated at the blockchain system 210.

The blockchain system 210 may receive the respective abstracts 420, 422, 424, 426, etc. Then, the blockchain system 210 may generate a checksum on the basis of the received abstracts 420, 422, 424 and 426 and store the checksum in a root 430. According to example implementations of the present disclosure, the checksum may be created on the basis of a Merkle tree. As is well known, Merkle is a tree structure and may be a binary tree, a multi-way tree, for example. A leaf node of the Merkle tree may have a value (including the received abstracts 420, 422, 424 and 426), and a value of a non-leaf node is data (e.g. hashes 432 and 434) calculated from values of all leaf nodes at lower levels.

In order to create the checksum on the basis of the Merkle tree, the abstracts 420, 422, 424 and 426 may be stored at leaf nodes, and then data at a non-leaf node may be determined on the basis of data at leaf nodes. For example, data in the abstracts 420 and 422 may be concatenated to form a character string, and subsequently a hash 432 of the character string may be determined on the basis of a predefined hash function. Similarly, data in the abstracts 424 and 426 may be concatenated to form a character string, and a hash 434 of the character string on the basis of a predefined hash function. Further, the hashes 432 and 434 may be concatenated, and a hash of concatenated character strings based on a hash function may be stored as a checksum in the root 430.

It will be understood although FIG. 4B illustrates a Merkle tree consisting of three levels, in other implementations there may be comprised more or less levels. It will be understood although FIG. 4B shows the specific structure of only one block node 440 in the blockchain, other block node 442 may have a similar structure. For example, the block node 442 may comprise a Merkle tree which is created on the basis of abstract information of earlier backup data 130.

It will be understood since a plurality of backup data 130 might be generated during the running procedure of the application system 110, according to example implementations of the present disclosure, an identifier for uniquely identifying the backup data 130 may be determined. For example, the identifier may be determined on the basis of a timestamp when the backup data 130 are generated. Alternatively and/or additionally, the identifier may be generated on the basis of a globally unique process id with which the backup data 130 are generated. Alternatively and/or additionally, the identifier may be determined on the basis of other approach.

After the identifier is determined, the identifier may be sent to the blockchain system 210, so as to store the identifier 444 to the blockchain system 210 in association with the root 430 which is determined using the abstract information. Specifically, metadata 440 may be generated on the basis of the identifier 444 and the root 430. With the example implementations, the backup data 130 may be uniquely differentiated with the identifier, and it may be found on the basis of the identifier where the abstract information corresponding to specific backup data 130 is stored in the blockchain system 210.

According to example implementations of the present disclosure, the metadata 440 may be generated using a key 442. Here the key 442 represents information of a key associated with encryption/decryption procedures. In this way, the metadata 440 can be protected with a higher security level.

Figure 5:
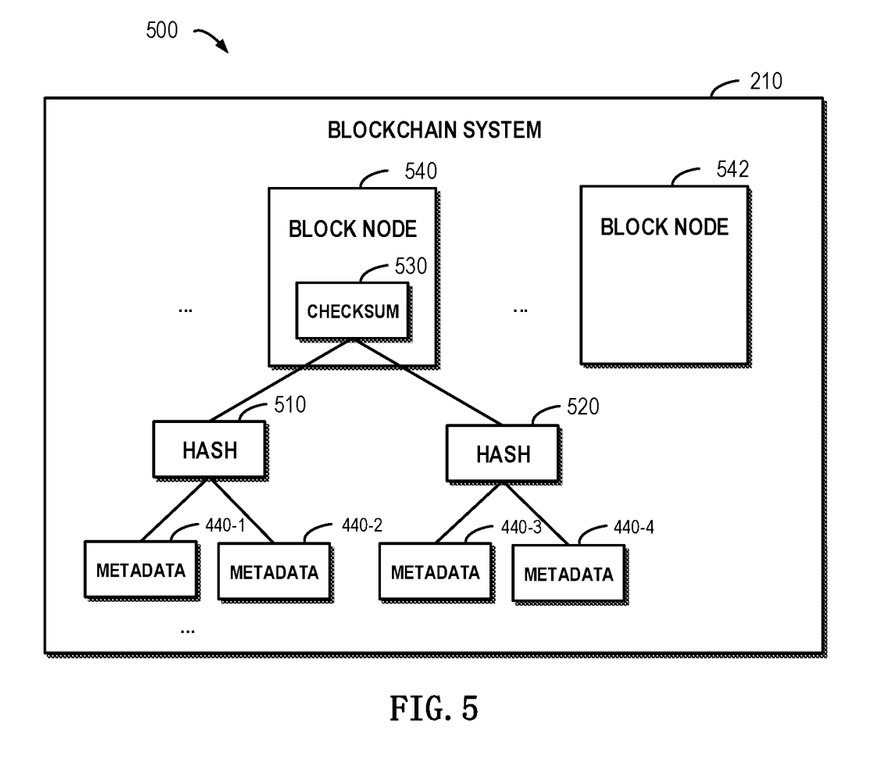
FIG. 5 schematically illustrates a block diagram of more details about a blockchain system according to implementations of the present disclosure.

FIG. 5 schematically shows a block diagram 500 of more details about a blockchain system according to implementations of the present disclosure. As depicted, a blockchain system 210 may comprise multiple block nodes 540, 542, etc., and each block chain may store information associated with different backup data. Description will be presented below by taking a block node 430 as one example. As shown in FIG. 5, metadata 440-1, 440-2, 440-3 and 440-4 at leaf nodes are metadata generated on the basis of the method described with reference to FIG. 4 above.

Further, another Merkle tree may be built on the basis of respective metadata. For example, a hash 510 may be determined on the basis of the metadata 440-1 and 440-2, a hash 520 may be determined on the basis of the metadata 440-3 and 440-4, and a checksum 530 at a root node of the Merkle tree may be determined on the basis of the hashes 510 and 520. Here the checksum 530 represents an overall checksum of different backup data. By storing the checksum 530 to a block node 540, metadata about multiple backup data may be linked to the blockchain system 210.

Description has been presented regarding how to store the abstract information 220 to the blockchain system 210. Returning to FIG. 3, description will be presented to more details about how to manage the application system 110 on the basis of the backup server 120 and the blockchain system 210. At block 350 in FIG. 3, the application system 110 may be managed on the basis of abstract information in the blockchain system 210 and the backup data 130 in the backup server 120. Specifically, if a restoration request to restore the application system 110 to the backup data 130 is received, abstract information of the backup data 130 may be obtained. Subsequently, content matching the abstract information may be looked up in the blockchain system 210, and the application system 110 may be managed on the basis of a lookup result.

Figure 6:
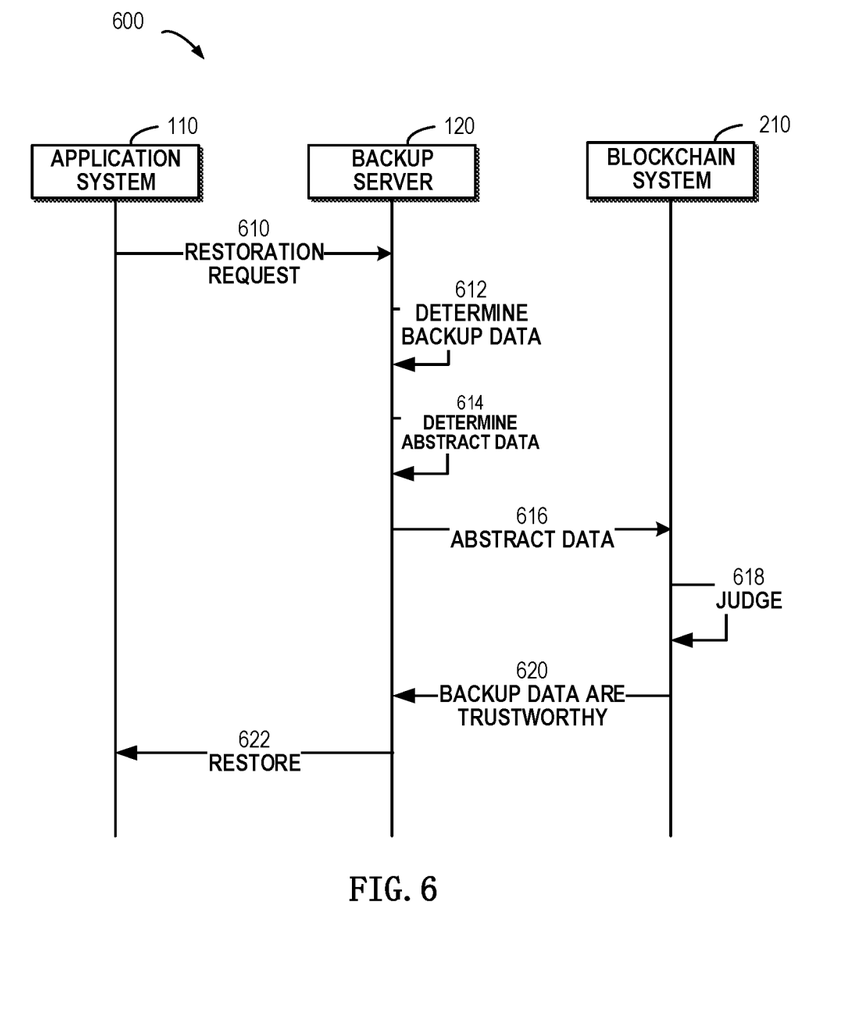
FIG. 6 schematically illustrates a block diagram of a process for managing an application system according to implementations of the present disclosure.

FIG. 6 schematically shows a block diagram 600 of the process for managing the application system 110 on the basis of implementations of the present disclosure. As depicted, as shown by an arrow 610, the backup server 130 may receive a restoration request from the application system 110. It will be understood the restoration request, though sent by the application system 110 in FIG. 6, may be generated at other position. For example, the restoration request may be automatically generated when a potential failure in the application system 110 is detected. The restoration request may specify to which version the application system 110 is to be restored (e.g. specified by an identifier of the backup data). Thus, as shown by an arrow 612, the backup server 120 may determine the backup data 130 on the basis of the restoration request. Subsequently, as shown by an arrow 614, the backup server 120 may determine abstract data associated with the backup data 130, and as shown by an arrow 616, may send the abstract data to the blockchain system 210.

Where the abstract data are received, as shown by an arrow 618, the blockchain system 210 may determine whether the abstract data from the backup server 120 are consistent with abstract data stored at the blockchain system 210 itself. If a judgment result is "Yes," then as shown by an arrow 620, the backup server 120 receives from the blockchain system 210 a message indicating the backup data are trustworthy. This means the backup data 130 at the backup server 120 are reliable and have not been tampered with. Then as shown by an arrow 622, the backup server 120 may restore the application system 110 on the basis of the backup data 130.

With reference to FIG. 4B, detailed description is presented below regarding how to determine whether abstract data from the backup server 120 are consistent with abstract data stored at the blockchain system 210. As depicted in FIG. 4B, at the blockchain system 210, current data at a root node of the Merkle tree may be determined on the basis of received abstracts 420, 42, 424 and 426 by using the above described method. By comparing data at the root node with historical data stored at the block node 440 of the blockchain system 210, it may be determined whether the backup data at the backup server 120 have been altered.

If the current data are consistent with the historical data (in other words, a reference abstract matching the abstract information exists in the blockchain system 210), then it may be determined the backup data 130 have not been tampered with. If the current data are different from the historical data (in other words, there exists no reference abstract matching the abstract information in the blockchain system 210), then it may be determined the backup data 130 have been tampered with. In the implementations, the data amount of the abstract is small, and the computation amount involved in determining data at the root node of the Merkle tree is also small. Therefore, whether the backup data 130 have been tampered with may be determined through a small computation amount and a simple comparison.

Figure 7:
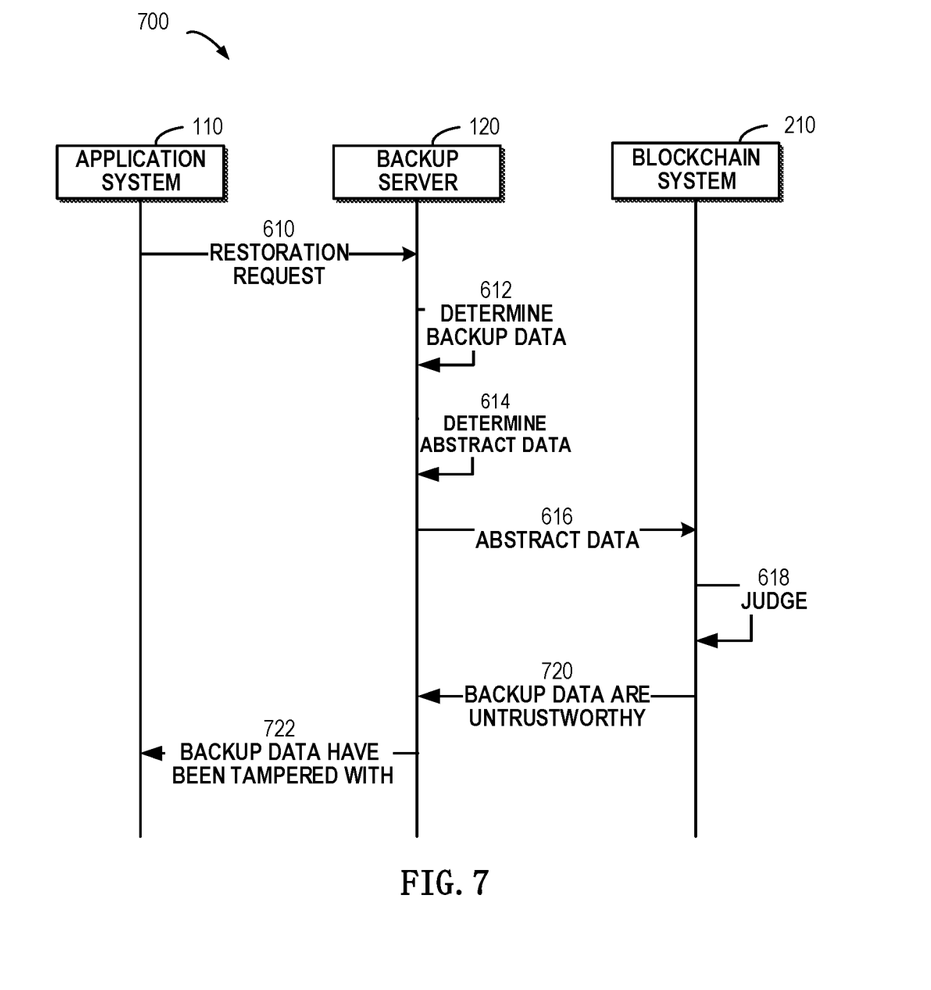
FIG. 7 schematically illustrates a block diagram of a process for managing an application system according to implementations of the present disclosure.

FIG. 7 schematically shows a block diagram 700 of the process for managing the application system 110 according to implementations of the present disclosure. Operations shown by arrows 610 to 618 in FIG. 7 are same as operations shown in FIG. 6, and operations different from FIG. 6 are shown by arrows 720 and 722. Specifically, at the arrow 720, if it is determined the backup data 130 have been tampered with, then the backup server 120 receives from the blockchain system 210 a message indicating the backup data 130 are untrustworthy. Subsequently, the backup server 120 may notify the application system 110 that the backup data 130 have been tampered with.

According to example implementations of the present disclosure, regarding a data block in the group of data blocks, at least one part of the application system may be restored on the basis of the data block and the location. As shown in Table 2 above, based on content of respective data blocks in the backup data 130 (as shown by the second column in Table 2) and locations of respective data blocks (as shown by the third column in Table 3), content of respective data blocks may be restored to corresponding locations. For example, regarding the three data blocks shown in Table 2, the first data block may be restored to loc1, loc2, loc3 and loc4; the second data block may be restored to loc5 and loc6; and the third data block may be restored to loc7, loc8 and loc9. With the example implementations, the backup data 130 which are verified to be reliable may be used to restore the application system 110, so as to ensure the reliability of the application system 110.

As examples of the method according to the present disclosure have been described in detail with reference to FIGS. 2 to 7 above, the implementation of a corresponding apparatus will be described below. According to example implementations of the present disclosure, provided is an apparatus for managing an application system. The apparatus comprises: a generating module configured to generate backup data of the application system in response to receiving a backup request for the application system; an obtaining module configured to obtain abstract information of the backup data on the basis of a predefined abstract rule; a transmitting module configured to transmit the abstract information to a blockchain system associated with the application system so as to store the abstract information to the blockchain system; and a managing module configured to manage the application system on the basis of the blockchain system and the backup data.

According to example implementations of the present disclosure, the obtaining module is further configured to: divide the backup data into a group of data blocks; generate respective abstracts for respective data blocks in the group of data blocks; and generate the abstract information on the basis of the respective abstracts.

According to example implementations of the present disclosure, the obtaining module is further configured to: extract a sample fragment from the backup data, the sample fragment appearing at multiple locations in the backup data; and divide the backup data into the group of data blocks on the basis of the multiple locations.

According to example implementations of the present disclosure, the obtaining module is further configured to: divide the backup data into the group of data blocks according to a predefined size associated with the application system.

According to example implementations of the present disclosure, the obtaining module is further configured to: regarding a given data block in the group of data blocks, determine a location of the given data block in the backup data; and generate an abstract for the given data block on the basis of the given data block and the location.

According to example implementations of the present disclosure, the obtaining module is further configured to: determine an identifier for uniquely identifying the backup data.

According to example implementations of the present disclosure, the transmitting module is further configured to: send the identifier to the blockchain system for storing the identifier in association with the abstract information to the blockchain system.

According to example implementations of the present disclosure, the transmitting module is further configured to: notify the blockchain system to link metadata, which are generated on the basis of the identifier and the abstract information, to a blockchain in the blockchain system.

According to example implementations of the present disclosure, the managing module is further configured to: obtain the abstract information of the backup data in response to receiving a restoration request to restore the application system to the backup data; verify whether the backup data have been tampered with, on the basis of the blockchain system and the abstract information; and restore the application system on the basis of the backup data in response to determining the backup data have not been tampered with.

According to example implementations of the present disclosure, the managing module is further configured to: determine the backupdata have not been tampered with, in response to there existing in the blockchain system a reference abstract that matches the abstract information; and determine the backup data have been tampered with, in response to there existing in the blockchain system no reference abstract that matches the abstract information.

According to example implementations of the present disclosure, the managing module is further configured to: regarding a data block in the group of data blocks, restore at least one part of the application system on the basis of the data block and the location.

Figure 8:
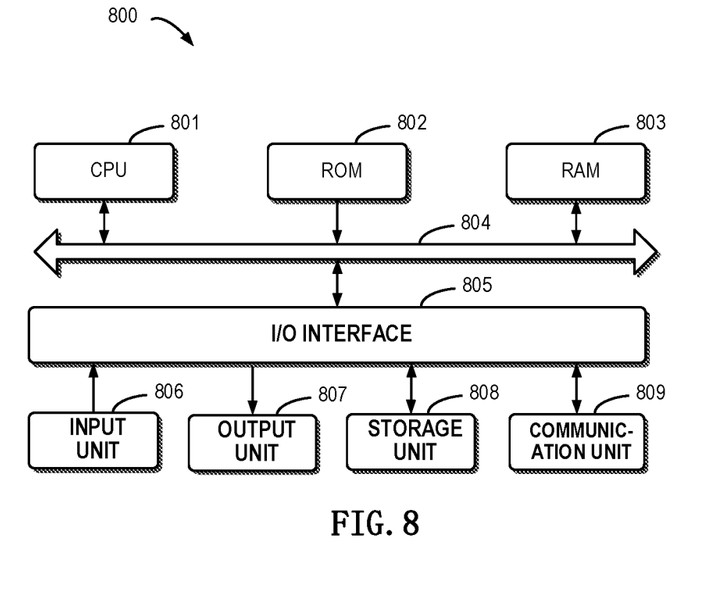
FIG. 8 schematically illustrates a block diagram of an apparatus for managing an application system according to example implementations of the present disclosure.

FIG. 8 schematically shows a block diagram of an apparatus 800 for managing an application system according to example implementations of the present disclosure. As depicted, the apparatus 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the apparatus 800. CPU 8901, ROM 802 and RAM 803 are connected to each other via a bus 804. The input/output (I/O) interface 805 is also connected to the bus 804.

A plurality of components in the apparatus 800 is connected to the I/O interface 805, including: an input unit 806, such as keyboard, mouse and the like; an output unit 807, e.g., various kinds of display and loudspeakers etc.; a storage unit 808, such as magnetic disk and optical disk etc.; and a communication unit 809, such as network card, modem, wireless transceiver and the like. The communication unit 809 allows the apparatus 800 to exchange information/data with other devices via the computer network, such as Internet, and/or various telecommunication networks.

The above described each process and treatment, such as the method 300, can also be executed by the processing unit 801. For example, in some implementations, the method 300 can be implemented as a computer software program tangibly included in the machine-readable medium, e.g., the storage unit 808. In some implementations, the computer program can be partially or fully loaded and/or mounted to the apparatus 800 via ROM 802 and/or the communication unit 809. When the computer program is loaded to the RAM 803 and executed by the CPU 801, one or more steps of the above described method 300 can be implemented. Alternatively, in other implementations, the CPU 801 also can be configured in other suitable manners to realize the above procedure/method.

According to example implementations of the present disclosure, there is provided an apparatus for managing an application system, the apparatus comprising: at least one processor; a volatile memory; and a memory coupled to the at least one processor, the memory having instructions stored thereon, the instructions, when executed by the at least one processor, causing the apparatus to perform acts. The acts include: generating backup data of the application system in response to receiving a backup request for the application system; obtaining abstract information of the backup data on the basis of a predefined abstract rule; transmitting the abstract information to a blockchain system associated with the application system so as to store the abstract information to the blockchain system; and managing the application system on the basis of the blockchain system and the backup data.

According to example implementations of the present disclosure, obtaining the abstract information comprises: dividing the backup data into a group of data blocks; generating respective abstracts for respective data blocks in the group of data blocks; and generating the abstract information on the basis of the respective abstracts.

According to example implementations of the present disclosure, dividing the backup data into a group of data blocks comprises: extracting a sample fragment from the backup data, the sample fragment appearing at multiple locations in the backup data; and dividing the backup data into the group of data blocks on the basis of the multiple locations.

According to example implementations of the present disclosure, dividing the backup data into a group of data blocks comprises: dividing the backup data into the group of data blocks according to a predefined size associated with the application system.

According to example implementations of the present disclosure, generating res [respective abstracts for respective data blocks in the group of data blocks comprises: regarding a given data block in the group of data blocks, determining a location of the given data block in the backup data; and generating an abstract for the given data block on the basis of the given data block and the location.

According to example implementations of the present disclosure, there is further comprised: determining an identifier for uniquely identifying the backup data; sending the identifier to the blockchain system for storing the identifier in association with the abstract information to the blockchain system.

According to example implementations of the present disclosure, there is further comprised: notifying the blockchain system to link metadata, which are generated on the basis of the identifier and the abstract information, to a blockchain in the blockchain system.

According to example implementations of the present disclosure, managing the application system on the basis of the blockchain system and the backup data comprises: obtaining the abstract information of the backup data in response to receiving a restoration request to restore the application system to the backup data; verifying whether the backup data have been tampered with, on the basis of the blockchain system and the abstract information; and restoring the application system on the basis of the backup data in response to determining the backup data have not been tampered with.

According to example implementations of the present disclosure, verifying whether the backup data have been tampered with comprises: determining the backupdata have not been tampered with, in response to there existing in the blockchain system a reference abstract that matches the abstract information; and determining the backup data have been tampered with, in response to there existing in the blockchain system no reference abstract that matches the abstract information.

According to example implementations of the present disclosure, restoring the application system on the basis of the backup data comprises: regarding a data block in the group of data blocks, restoring at least one part of the application system on the basis of the data block and the location.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing an application system, comprising:
generating backup data of the application system in response to receiving a backup request for the application system, wherein the backup request is triggered in response to determining a potential anomaly event occurs in the application system;
obtaining abstract information of the backup data on the basis of a predefined abstract rule, wherein the abstract information includes a plurality of abstracts, wherein each abstracts corresponds to one data block of a group of data blocks in the backup data, and wherein each abstracts includes information of the corresponding data block and a location of the corresponding data block;
transmitting the abstract information to a blockchain system associated with the application system so as to store the abstract information to the blockchain system;
obtaining the abstract information of the backup data in response to receiving a restoration request to restore the application system to the backup data;
verifying whether the backup data have been tampered with, on the basis of the blockchain system and the abstract information by comparing a reference abstract of historical data to the abstract information exists in the blockchain system; and
restoring the application system on the basis of the backup data in response to determining the backup data have not been tampered with.

2. The method of claim 1, wherein obtaining the abstract information comprises:
dividing the backup data into the group of data blocks;
generating respective abstracts for respective data blocks in the group of data blocks; and
generating the abstract information on the basis of the respective abstracts.

3. The method of claim 2, wherein dividing the backup data into a group of data blocks comprises:
extracting a sample fragment from the backup data, the sample fragment appearing at multiple locations in the backup data; and
dividing the backup data into the group of data blocks on the basis of the multiple locations.

4. The method of claim 2, wherein dividing the backup data into a group of data blocks comprises:
dividing the backup data into the group of data blocks according to a predefined size associated with the application system.

5. The method of claim 2, wherein generating respective abstracts for respective data blocks in the group of data blocks comprises:
regarding a given data block in the group of data blocks, determining a location of the given data block in the backup data; and
generating an abstract for the given data block on the basis of the given data block and the location.

6. The method of claim 5, further comprising:
receiving from the blockchain system a message indicating the backup data are untrustworthy when the blockchain system determines the backup data have been tampered with; and
notifying the application system that the backup data have been tampered with.

7. The method of claim 6, wherein verifying whether the backup data have been tampered with comprises:
determining the backup data have not been tampered with, in response to there existing in the blockchain system a reference abstract that matches the abstract information; and
determining the backup data have been tampered with, in response to there existing in the blockchain system no reference abstract that matches the abstract information.

8. The method of claim 7, wherein restoring the application system on the basis of the backup data comprises:
regarding a data block in the group of data blocks, restoring at least one part of the application system on the basis of the data block and the location.

9. The method of claim 2, further comprising:
determining an identifier for uniquely identifying the backup data; and
sending the identifier to the blockchain system for storing the identifier in association with the abstract information to the blockchain system.

10. The method of claim 9, further comprising:
notifying the blockchain system to link metadata, which are generated on the basis of the identifier and the abstract information, to a blockchain in the blockchain system.

11. An apparatus for managing a storage system, comprising:
at least one processor;
a volatile memory; and
a memory coupled to the at least one processor and having instructions stored thereon, which when executed by the at least one processor, causing the at least one processor to perform operations, the operations comprising:
- generating backup data of the application system in response to receiving a backup request for the application system, wherein the backup request is triggered in response to determining a potential anomaly event occurs in the application system;
- obtaining abstract information of the backup data on the basis of a predefined abstract rule, wherein the abstract information includes a plurality of abstracts, wherein each abstracts corresponds to one data block of a group of data blocks in the backup data, and wherein each abstracts includes information of the corresponding data block and a location of the corresponding data block;
- transmitting the abstract information to a blockchain system associated with the application system so as to store the abstract information to the blockchain system;
- obtaining the abstract information of the backup data in response to receiving a restoration request to restore the application system to the backup data;
- verifying whether the backup data have been tampered with, on the basis of the blockchain system and the abstract information by comparing a reference abstract of historical data to the abstract information exists in the blockchain system; and
- restoring the application system on the basis of the backup data in response to determining the backup data have not been tampered with.

12. The apparatus of claim 11, wherein obtaining the abstract information comprises:
- dividing the backup data into the group of data blocks;
- generating respective abstracts for respective data blocks in the group of data blocks; and
- generating the abstract information on the basis of the respective abstracts.

13. The apparatus of claim 12, wherein dividing the backup data into a group of data blocks comprises:
- extracting a sample fragment from the backup data, the sample fragment appearing at multiple locations in the backup data; and
- dividing the backup data into the group of data blocks on the basis of the multiple locations.

14. The apparatus of claim 12, wherein dividing the backup data into a group of data blocks comprises:
- dividing the backup data into the group of data blocks according to a predefined size associated with the application system.

15. The apparatus of claim 12, wherein generating respective abstracts for respective data blocks in the group of data blocks comprises:
- regarding a given data block in the group of data blocks, determining a location of the given data block in the backup data; and
- generating an abstract for the given data block on the basis of the given data block and the location.

16. The apparatus of claim 15, wherein the operations further comprise:
- receiving from the blockchain system a message indicating the backup data are untrustworthy when the blockchain system determines the backup data have been tampered with; and
- notifying the application system that the backup data have been tampered with.

17. The apparatus of claim 16, wherein verifying whether the backup data have been tampered with comprises:
- determining the backup data have not been tampered with, in response to there existing in the blockchain system a reference abstract that matches the abstract information; and
- determining the backup data have been tampered with, in response to there existing in the blockchain system no reference abstract that matches the abstract information.

18. The apparatus of claim 17, wherein restoring the application system on the basis of the backup data comprises: regarding a data block in the group of data blocks,
- restoring at least one part of the application system on the basis of the data block and the location.

19. The apparatus of claim 12, wherein the operations further comprise:
- determining an identifier for uniquely identifying the backup data; and
- sending the identifier to the blockchain system for storing the identifier in association with the abstract information to the blockchain system.

20. The apparatus of claim 19, wherein the operations further comprise:
- notifying the blockchain system to link metadata, which are generated on the basis of the identifier and the abstract information, to a blockchain in the blockchain system.

21. A non-transitory computer-readable medium having instructions stored therein, which when executed by a processor, cause the processor to perform operations, the operations including:
- generating backup data of the application system in response to receiving a backup request for the application system, wherein the backup request is in response to determining a potential anomaly event occurs in the application system;
- obtaining abstract information of the backup data on the basis of a predefined abstract rule, wherein the abstract information includes a plurality of abstracts, wherein each abstracts corresponds to one data block of a group of data blocks in the backup data, and wherein each abstracts includes information of the corresponding data block and a location of the corresponding data block;
- transmitting the abstract information to a blockchain system associated with the application system so as to store the abstract information to the blockchain system;
- obtaining the abstract information of the backup data in response to receiving a restoration request to restore the application system to the backup data;
- verifying whether the backup data have been tampered with, on the basis of the blockchain system and the abstract information by comparing a reference abstract of historical data to the abstract information exists in the blockchain system; and
- restoring the application system on the basis of the backup data in response to determining the backup data have not been tampered with.

* * * * *